United States Patent [19]

Yokokawa et al.

[11] Patent Number: 4,690,504

[45] Date of Patent: Sep. 1, 1987

[54] QUARTZ GLASS-MADE OPTICAL FIBERS AND A METHOD FOR THE PREPARATION THEREOF

[75] Inventors: Kiyoshi Yokokawa; Kazuo Koya, both of Gunma, Japan

[73] Assignee: Shin-Etsu Chemical Co., Ltd., Tokyo, Japan

[21] Appl. No.: 739,874

[22] Filed: May 31, 1985

[30] Foreign Application Priority Data

Jun. 4, 1984 [JP] Japan ................. 59-114317

[51] Int. Cl.⁴ .................................... G02B 6/00
[52] U.S. Cl. .................. 350/96.34; 350/96.31
[58] Field of Search ............ 350/96.29, 96.30, 96.31, 350/96.34

[56] References Cited

U.S. PATENT DOCUMENTS

| | | | |
|---|---|---|---|
| 4,210,386 | 7/1980 | Araujo et al. | 350/96.34 |
| 4,217,027 | 8/1980 | MacChesney et al. | 350/96.31 |
| 4,372,647 | 2/1983 | Okamoto et al. | 350/96.34 |
| 4,439,007 | 3/1984 | Lazay et al. | 350/96.34 |
| 4,447,125 | 5/1984 | Lazay et al. | 350/96.34 |
| 4,519,826 | 5/1985 | Tran | 350/96.34 |
| 4,557,561 | 12/1985 | Schneider et al. | 350/96.34 |
| 4,610,506 | 9/1986 | Tokunaga et al. | 350/96.34 |

*Primary Examiner*—Robert E. Wise
*Attorney, Agent, or Firm*—Wenderoth, Lind & Ponack

[57] ABSTRACT

The quartz glass-made optical fiber of the invention is formed of the core portion and the cladding portion each doped with fluorine to decrease the refractive index, the concentration of fluorine being higher in the cladding than in the core, so that the core portion has a refractive index lower by 0.01 to 0.1% than that of an undoped fused quartz glass and the cladding portion has a refractive index lower by at least 0.2% than that of the core portion. By virtue of the fluorine doping throughout, the optical fiber is free from the drawbacks due to the oxygen deficiency in the fused quartz glass and the light transmission performance thereof is remarkably stable. A method for the preparation of the optical fiber is proposed including the steps of silica particle deposition by the flame hydrolysis of a silicon compound, doping with a fluorine compound and vitrification for each of the core and the cladding portions.

5 Claims, 2 Drawing Figures

QUARTZ GLASS-MADE OPTICAL FIBERS AND A METHOD FOR THE PREPARATION THEREOF

BACKGROUND OF THE INVENTION

The present invention relates to a quartz glass-made optical fiber and a method for the preparation thereof. More particularly, the invention relates to a quartz glass-made optical fiber composed of the core portion and the cladding layer, of which the difference in the refractive index between the core and cladding is produced by the difference in the concentration of the same dopant between these two portions.

As is known, a quartz glass-made optical fiber of the step index type is formed of the core portion having a relatively high refractive index and a cladding portion surrounding the core and having a refractive index lower than that of the core portion. A typical means for providing such a difference in the refractive indices is that the core portion of the optical fiber is formed of a fused quartz glass doped with an oxide of a metal or metalloid element having an effect of increasing the refractive index of the quartz glass while the cladding portion is formed of an undoped quartz glass. One of the most widely used dopants in this case is germanium oxide $GeO_2$ by virtue of the absence of absorption in the wave length region used in the optical communication, good compatibility with quartz glass and easiness in handling and purification because the starting compound of germanium oxide is liquid at room temperature. Disadvantages accompanying the use of germanium oxide as the dopant are the expensiveness of the germanium compounds due to the scantiness of the germanium resources and the poor resistance of germanium-doped optical fibers against ionizing radiations to cause gradual increase in the transmission loss of light in the lapse of time.

With an object to solve the above described problems, a proposal has been made of an optical fiber having a structure in which the core portion is formed of high-purity fused quartz glass and the cladding layer is formed of fused quartz glass doped with a dopant having an effect of decreasing the refractive index such as fluorine and boron. A problem is still left unsolved in the optical fibers of this type that structural defects such as oxygen deficiency are formed in the high-purity fused quartz glass in the course of the melt spinning at high temperatures and the absorption loss of light is increased for the reason that hydrogen molecules are trapped therein.

SUMMARY OF THE INVENTION

An object of the present invention is therefore to provide a quartz glass-made optical fiber having a core and cladding structure free from the above described problems and disadvantages in the conventional optical fiberes.

Thus, the optical fiber of fused quartz glass of the present invention having a core-and-cladding structure is formed of a core portion and a cladding portion surrounding the core portion, of which each of the core portion and cladding portion contains fluorine as a dopant to decrease the refractive index of the fused quartz glass, the concentration of the fluorine being higher in the cladding portion than in the core portion.

The invention also provides a method for the preparation of the above defined novel quartz glass-made optical fiber, which method comprises the steps of:

(a) depositing fine particles of silica produced by the flame hydrolysis of a silicon-containing starting compound to form a porous silica body grown in a cylindrical form;

(b) heating the cylindrical porous silica body in an atmosphere containing a fluorine compound to cause diffusion of the fluorine compound into the porous silica body;

(c) vitrifying the porous silica body by fusion to form a transparent quartz glass rod containing fluorine for the core portion;

(d) depositing fine particles of silica produced by the flame hydrolysis of a silicon-containing starting compound on and around the quartz glass rod for the core portion to form a porous layer of silica on the core portion;

(e) heating the porous layer of silica on the core portion in an atmosphere containing a fluorine compound to cause diffusion of the fluorine compound into the porous layer in a concentration higher than the concentration of fluorine in the core portion;

(f) vitrifying the porous layer of silica into transparent quartz glass by heating to form a base material of optical fibers formed of a core portion and an outer layer around the core portion each containing fluorine, the concentration of fluorine being higher in the outer layer than in the core portion; and (g) melt spinning the base material into a fiber.

DETAILED DESCRIPTION OF THE PREFERRED EMBODIMENTS

Figure 1:
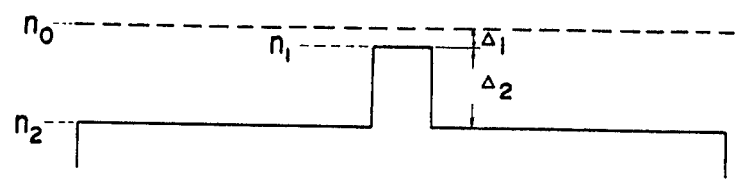
FIGS. 1 and 2 each illustrate the distribution of the refractive index within the cross section of the optical fibers prepared in Examples 1 and 2, respectively.

In the preparation of the inventive optical fiber having the above described structure, the step to precede the melt spinning is the preparation of a base material of fused quartz glass composed of a rod-like core portion of quartz glass containing fluorine in a relatively low concentration and an outer layer formed on and around the core portion of quartz glass containing fluorine in a relatively high concentration. Namely, a porous quartz glass body in a cylindrical form is first obtained by the flame hydrolysis of a gaseous mixture containing a hydrolyzable or oxidatively decomposable silicon compound such as silicon tetrachloride as the principal ingredient supplied into a high-temperatuere flame such as an oxyhydrogen flame in which the silicon compound is decomposed and converted into fine particles of silica successively deposited to form a porous cylindrical form of silica grown in the axial direction.

In the next place, the thus obtained cylindrical porous silica body is heated and vitrified at a temperature in the range from about 1000° to about 1600° C. in an atmosphere of an inert gas such as helium containing a fluorine compound in a relatively low concentration of, for example, 1% by volume or smaller to give a transparent quartz glass rod containing fluorine in a relatively low concentration. It is optional that the cylindrical porous silica body is first heated in the fluorine-containing atmosphere as mentioned above to be doped with fluorine and then heated in an atmosphere of an inert gas alone to complete vitrification. The content of fluorine as the dopant in thus vitrified quartz glass rod should preferably be in such a range that the refractive index of the thus doped quartz glass is lower by 0.01 to 0.1% than that of an undoped high-purity fused quartz glass. When the concentration of fluorine as the dopant is too high in the quartz glass rod, which is the precursor of the core in the finished optical fiber, no sufficiently large difference can be obtained in the refractive indices between the core and cladding of the optical fiber. When the concentration of fluorine is too low in the quartz glass rod, on the other hand, the desired effect of fluorine doping may be reduced to eliminate the adverse influences of the oxygen deficiency in the fused quartz glass. An alternative way for the preparation of a fused quartz glass rod doped with fluorine in such a low concentration is to perform flame hydrolysis of a starting silicon compound as admixed with a small amount of a fluorine-containing compound to deposit fluorine-doped silica particles in a cylindrical porous form which is then subjected to vitrification by heating.

The next step is the formation of an outer porous silica layer on and around the above obtained quartz glass rod doped with fluorine in a relatively low concentration by the deposition of fine silica particles produced by the flame hydrolysis of a starting silicon-containing compound. This step of silica particle deposition can readily be performed by blowing the flame of an oxhydrogen burner fed with the starting silicon compound at the fused quartz glass rod for the core under rotation around its own axis while the quartz glass rod and/or the burner are under relative reciprocative movements in the axial direction of the rod so that the silica particles in the flame are uniformly deposited to cause grwoth of the outer porous layer in the radial direction.

The step to follow the above described formation of the porous outer layer of silica is the doping and vitrification of the porous layer. Thus, the porous outer layer of silica particle deposition on the quartz glass rod is heated and vitrified at a temperature in the range from about 1000° to about 1600° C. in an atmosphere of an inert gas such as helium containing a fluorine compound to give a transparent outer layer of fused quartz glass doped with fluorine in a concentration higher than that in the core portion. The concentration of the fluorine compound in the heating atmosphere of the inert gas should preferably be in the range from 1 to 10% by volume in order that the content of fluorine as the dopant is sufficiently high as to give a refractive index of the outer layer after vitrification lower by at least 0.2% than that of an undoped high-purity fused quartz glass. It is optional that the vitrification is performed following the doping treatment in a fluorine-containing atmosphere by heating the doped porous outer layer in an atmosphere of an inert gas alone. If necessary, an outermost layer of fused quartz glass may be formed by the rod-in-tube method or by the outer CVD method.

The principal ingredient in the gaseous feed to the oxyhydrogen burner is a silicon compound convertible into silica particles by the flame hydrolysis. Typically, such a silicon compound is represented by the general formula $R_mSiX_{4-m}$, in which R is a hydrogen atom or a monovalent hydrocarbon group such as methyl and ethyl groups, X is an atom of halogen such as chlorine and fluorine or an alkoxy group such as methoxy and ethoxy groups and m is zero or a positive integer not exceeding 4. Particular examples of such a silicon compound include, for example, silicon tetrachloride, silicon tetrafluoride, trichlorosilane, silane, methyl trichlorosilane, methyl trimethoxysilane, tetramethoxy silane, tetraethoxy silane and the like, of which silicon tetrachloride is used usually.

Suitable fluorine compounds used in the doping of the porous body of silica particle deposition include fluorocarbons, fluorochlorocarbons, sulfur fluorides, silicon fluorides, boron fluorides, phosphorus fluorides, sulfur oxyfluorides, silicon oxyfluorides and the like. Particular examples of such fluorine compounds are carbon tetrafluoride, perfluoroethane, dichloro difluorometahne, trifluoro chloromethane, sulfur tetrafluoride, sulfur hexafluoride, silicon tetrafluoride, hexafluorodisilane, boron trifluoride, phosphorus trifluoride, phosphoryl fluoride, thionyl fluoride, $SO_2F_2$, $Si_2OF_6$, $Si_3O_2F_8$ and others, of which the sulfur oxyfluorides and silicon oxyfluorides are preferable as the dopant.

The final step of the inventive method is melt spinning of the fused quartz glass base material of optical fibers obtained in the above described manner, which is composed of the core portion doped with fluorine in a relatively low concentration and the outer layer on and around the core portion doped with fluorine in a relatively high concentration. The method of the melt spinning is well known in the art and need not be described here.

The quartz glass-made optical fiber of the invention of course has a structure of core and cladding both doped with fluorine though in different concentrations, lower in the core and higher in the cladding. Accordingly, the inventive optical fiber is relatively free from the drawbacks of structural defects due to oxygen deficiency and the like. In particular, the inventive optical fiber is excellent in the durability or long-term stability of light transmission performance by virtue of the extremely small increasing tendency of transmission loss of light even in a hydrogen-containing atmosphere as well as in the resistance against ionizing radiations so that the inventive optical fiber can impart very high efficiency and reliability to the communication system by use thereof. Moreover, the inventive optical fiber is economically advantageous because no expensive germanium compounds are used as the dopant.

Following are examples to illustrate the method of the invention and the performance of the inventive optical fibers in more detail.

EXAMPLE 1

Flame hydrolysis of gasified silicon tetrachloride at a rate of 380 ml/minute was performed in an oxyhydrogen flame formed of 6 liters/minute of hydrogen gas and 10 liters/minute of oxygen gas by use of a quadruply coaxial multi-tubular burner of fused quartz glass and a cylindrical porous silica body was grown by the deposition of the fine silica particles in the axial direction.

This porous cylindrical body of silica was heated at 1200° C. for 2 hours in an atmosphere of helium containing 0.5% by volume of thionyl fluoride so that the porous body was vitrified into a tranaparent fused quartz glass rod. The refractive index thereof was lower by 0.05% than that of a high-purity fused quartz glass.

In the next place, an outer porous layer of silica was formed on and around the above obtained fused quartz glass rod by the deposition of fine silica particles produced by flame hydrolysis of silicon tetrachloride in a similar manner to above and the outer porous layer was heated at 1500° C. for 3 hours in an atmosphere of helium containing 4% by volume of $Si_2OF_6$ so that the porous layer was converted into a transparent fused quartz glass having a refractive index lower by 0.33% than that of the fused quartz glass in the core portion surrounded by the outer layer. FIG. 1 of the accompanying drawing schematically illustrates the distribution profile of the refractive index in the cross section of the thus prepared quartz glass base material as a precursor of optical fibers in which $n_0$, $n_1$ and $n_2$ are each the refractive index of an undoped high-purity fused quartz glass, the core portion of low fluorine doping and the outer layer portion of high fluorine doping, resepectively, and $\Delta_1$, i.e. $(n_0-n_1)/n_0$, and $\Delta_2$, i.e. $(n_1-n_2)/n_1$, are 0.05% and 0.33%, respectively.

The above prepared quartz glass base material of optical fibers was subjected to melt spinning from a high-temperature furnance at 2200° C. at a spinning velocity of 3 meters/second into a single-mode optical fiber having an outer diameter of 125 μm and a core diameter of 9 μm. The distribution profile of refractive index in this optical fiber was substantially the same as illustrated in FIG. 1 and the transmission loss of light therethrough at a wave length of 1.3 μm was as small as 0.42 dB/km.

With an object to evaluate the stability of the light transmission performance, a 500 meters length of this optical fiber was heated at 200° C. for 72 hours in an atmosphere containing hydrogen gas and the light transmission loss at a wave length of 1.39 μm was determined before and after this heat treatment to give 2.6 dB/km and 2.7 dB/km, respectively. For comparison, the same stability test was undertaken of a conventional quartz glass-made optical fiber having a fluorine-doped cladding but containing no fluorine in the core to give corresponding values of 2.8 dB/km and 4.1 dB/km before and after the heating treatment, respectively.

EXAMPLE 2

Figure 2:
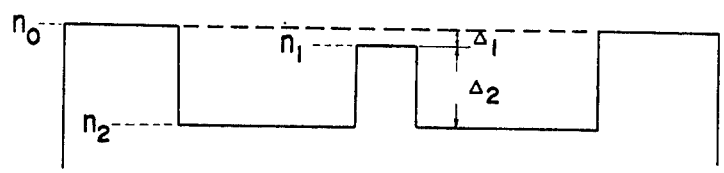

The quartz glass base material of optical fibers prepared in Example 1 was covered with a just fitting tube of high-purity quartz glass and subjected together to melt spinning in the same manner as in the preceding example to give an optical fiber having a distribution profile of the refractive index as is schematically illustrated in FIG. 2, in which each of the symbols has the same meaning as defined for FIG. 1.

What is claimed is:

1. An optical fiber of fused quartz glass having a core-and-cladding structure composed of a core portion and a cladding portion on and around the core portion, of which each of the core portion and cladding portion contains fluorine as a dopant to decrease the refractive index of the fused quartz glass, the concentration of the fluorine being higher in the cladding portion than in the core portion, and wherein the core portion has a refractive index lower by 0.01% to 0.1 than that of an undoped fused quartz glass.

2. The optical fiber of fused quartz glass as claimed in claim 1 wherein the cladding portion has a refractive index lower by at least 0.2% than that of the core portion.

3. A method for the preparation of an optical fiber of fused quartz glass having a core-and cladding structure composed of a core portion and a cladding portion on and around the core portion, of which each of the core portion and cladding portion contains fluorine as a dopant to decrease the refractive index of the fused quartz glass, and this the core portion has a refractive index lower by 0.01 to 0.1% than that of an undoped fused quartz glass, the concentration of the fluorine being higher in the cladding portion than in the core portion, which comprises the steps of:

(a) depositing fine silica particles produced by the flame hydrolysis of a silicon-containing starting compound to form a porous silica body grown in a cylindrical form;

(b) heating the cylindrical porous silica body in an atmosphere containing a fluorine compound to cause diffusion of the fluorine compound into the porous silica body;

(c) vitrifying the porous silica body by fusion to form a transparent quart glass rod containing fluorine for the core portion;

(d) depositing fine silica particles produced by the flame hydrolysis of a silicon-containing starting compound on and around the quartz glass rod for the core portion to form a porous layer of silica on the quartz glass rod for the core portion;

(e) heating the porous layer of silica on the quartz glass rod in an atmosphere containing a fluorine compound to cause diffusion of the fluorine compound into the porous layer in a concentration higher than the concentration of fluorine in the quartz glass rod for the core portion;

(f) vitrifying the porous layer of silica into transparent quartz glass by heating to form a base material of optical fibers formed of a core portion and an outer layer on and around the core portion each containing fluorine, the concentration of fluorine being higher in the outer layer than in the core portion; and (g) melt-spinning the base material into a fiber.

4. The method as claimed in claim 3 wherein the heating in the step (b) is performed at a temperature in the range from 1000° to 1600° C. in an atmosphere of an inert gas containing 1% by volume or less of the fluorine compound.

5. The method as claimed in claim 3 wherein the heating in the step (e) is performed at a temperature in the range from 1000° to 1600° C. in an atmosphere of an inert gas containing from 1 to 10% by volume of the fluorine compound.

* * * * *